April 4, 1961 W. L. WEIKLY 2,977,969
ANGLE COCK OR VALVE FOR AIR BRAKE SYSTEMS
Filed July 30, 1958 2 Sheets-Sheet 1

INVENTOR.
William L. Weikly,
BY Richard D. Cifelli,
Attorneys

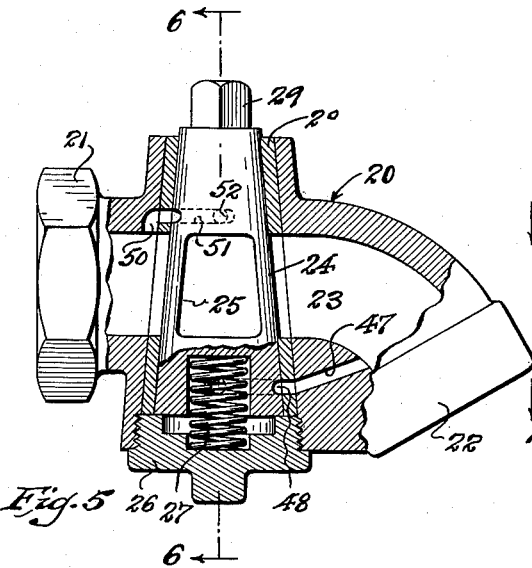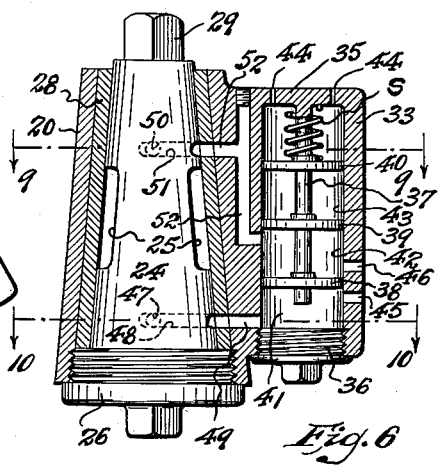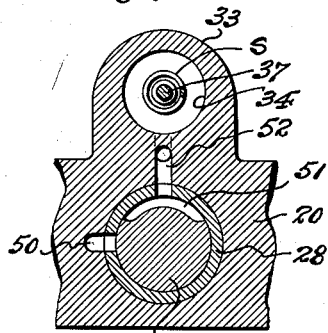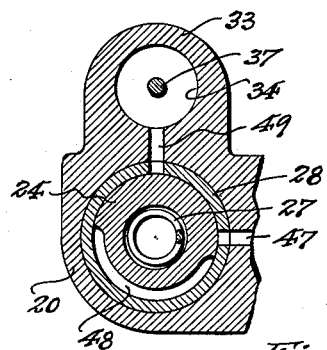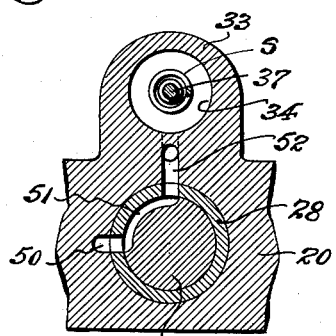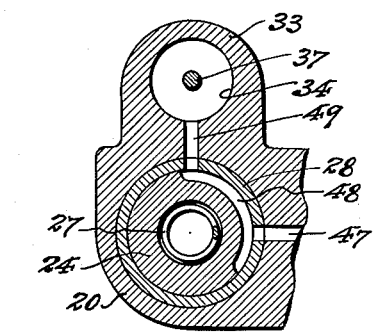

United States Patent Office 2,977,969
Patented Apr. 4, 1961

2,977,969
ANGLE COCK OR VALVE FOR AIR BRAKE SYSTEMS

William L. Weikly, 123 Summit Ave., Phillipsburg, N.J.

Filed July 30, 1958, Ser. No. 752,016

1 Claim. (Cl. 137—87)

This invention relates to compressed air systems operative to control brakes of railway cars or the like; and the invention has reference, more particularly, to improvements in angle cocks or valves used in such systems to connect train pipes at each end of each car with coupling hose members, which hose members, when joined, connect the train pipe of one car with that of the next adjacent car.

This invention has for an object to provide angle cocks or valves which include improved automatic vent valve means of very simple construction, which, when any one angle cock or valve in a train series thereof is closed, either deliberately, accidentally or surreptitiously, is operative to release air pressure in the train pipes, so that car brakes will automatically set themselves to braking condition; and also, when any two angle cocks or valves between adjoining cars of a train are closed, operate to release air pressure in the intermediate joined coupling hose members, so that the latter can be uncoupled without risk of injury to the operator.

The above and other objects will be understood from a reading of the following description of an embodiment of this invention in connection with the accompanying drawings, in which:

Fig. 5 is a longitudinal sectional view, similar to that of Fig. 3, but showing the angle cock or valve in closed condition, and Fig. 6 is a transverse sectional view, taken on line 6—6 in Fig. 5, showing the automatic vent valve means operative.

Figure 4:
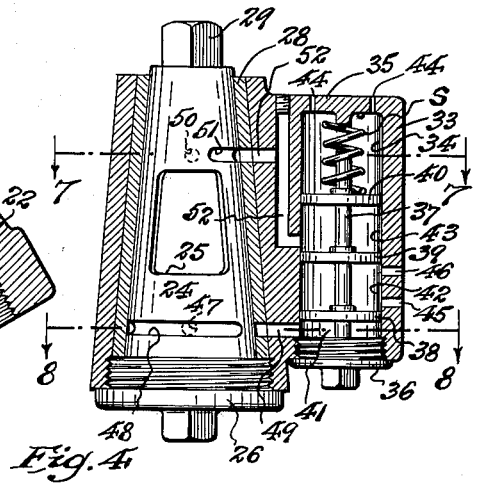
Fig. 4 is a transverse sectional view, taken on line 4—4 in Fig. 3; the angle cock, or valve being shown in these views in its normal open position to connect train pipes of adjoining cars in communication one with another.

Figs. 7 and 8 are respectively fragmentary horizontal sectional views, respectively taken on line 7—7 and line 8—8 in Fig. 4.

Figs. 9 and 10 are respectively fragmentary horizontal sectional views, respectively taken on line 9—9 and line 10—10 in Fig. 6.

Referring to the drawings, in which like characters of reference indicate corresponding parts, the reference character 15 designates portions of respective train air pipes of adjoining cars of a train, 16 the angle cocks or valves according to this invention as respectively affixed on the opposed ends of said train pipes, 17 the usual flexible air hose members coupling said train pipes together; the meeting ends of said coupling hose members being releasably joined together by cooperative coupler devices 18.

The angle cock or valve, according to this invention, comprises a casing body 20 which is adapted to be connected by its inner end 21 with a train pipe 15, and at its outer end 22 to receive connection therewith of a coupling hose member 17, all in the manner well known to the art.

The casing body 20 provides the usual through passage 23, and is provided with a vertical seat for a tapered main valve plug 24, which seat intersects said passage. The valve plug 24 is provided with the usual transverse opening or port 25 for alignment with the through passage 23, when the valve plug is disposed in its normal open position, shown in Figs. 3 and 4; said valve plug having side surfaces to close said passage 23 when the valve plug is disposed in its closed position shown in Figs. 5 and 6. The valve plug 24 is held in operative assembled relation to the casing body 20 by a threaded cap 26, and is urged to its seat by a compression spring 27, which is interposed between the same and said cap 26. A bearing sleeve or bushing 28 for seating the valve plug is generally provided, and is suitably affixed to the casing body 20 as a stationary and unitary part of the latter. At the upper end of the valve plug 24, which projects exteriorly from the casing body, is provided a polygonal head 29 which is adapted to receive the usual and well known handle lever 30 for operating the angle cock or valve. Provided on the casing body, adjacent to the head 29 of the valve plug, are the usual stop lugs 31 and 32 which cooperate with the handle lever 30 for stopping the same in its two positions in the well known manner; the lug 31 serving as a stop when the handle lever is moved to turn the valve plug 24 to open position, and the lug 32 serving as a stop when the handle lever is moved to turn the valve plug to closed position.

Provided in connection with the casing body 20, as an integral or at least a unitary part thereof, so as to project laterally from a side of said casing body parallel to the vertical axis of the valve plug 24, is a casing extension or cylinder 33 which houses an automatic vent valve means according to this invention. This casing extension or cylinder 33 is provided with a bore 34, that is closed at its top and bottom ends, being closed at one such end, e.g. the top end, by an end wall 35, and at its other end, e.g. the bottom end, by a threaded cap 36. Vertically movable in the bore 34 of the casing extension or cylinder 33 is a unitary vent valve member, which comprises a stem 37 and vertically spaced apart piston sections, which comprise a lower piston section 38, an intermediate piston section 39 and an upper piston section 40. The vent valve member thus formed is yieldably urged to a downwardly moved normal initial position by a compression spring S, interposed between the top end wall 35 of the casing extension or cylinder 33 and the upper piston section 40. In its downwardly moved normal initial position, the vent valve member is stopped by the abutment of the lower end of its stem 37 against the bottom closed end of the bore 34, and in such position that a chamber 41 is provided between the latter and the lower piston section 38, into which chamber 41, under conditions hereinafter described, air from adjoined coupling hose members 17 may enter.

Between the lower piston section 38 and the intermediate piston section 39 is provided a chamber 42 into which, under conditions hereinafter described, air from a train pipe 15 may enter.

Between the intermediate piston section 39 and the upper piston section 40 is provided a chamber 43 which, under conditions hereinafter described, communicates with the train pipe 15 while the vent valve member is closed and the angle cock or valve is closed, so that pressure of train pipe air upon the vent valve member is counterbalanced, since such pressure exerts downward thrust against the intermediate piston section 39 which is balanced by upward thrust against the upper piston section 40, and consequently offers no impedance to movement of the vent valve member to open position, under conditions hereinafter set forth. This chamber 43 may be hereinafter referred to as a balancing chamber.

Communicating with the bore 34 of the casing extension or cylinder 33, above the upper piston section 40, are air escape vents 44, whereby to prevent air compression above the vent valve member which would impede operative opening movement thereof.

Provided in an external side wall of the casing extension or cylinder 33 are suitably located a coupling hose member air vent port 45 and a train pipe air vent port 46.

Provided in the lower portion of the hose attached end 22 of the angle cock or valve body 20, to extend from the through passage 23 of the latter to the periphery of the valve plug 24, is a duct 47. This duct 47 is adapted, at proper times, to communicate with a segmental channel 48 with which the periphery of the valve plug 24 is provided. Said channel 48 is adapted to bridge the duct 47 and a passage 49 leading to the vent valve member when the valve plug 24 is turned to closed position (see Figs. 5 and 6), but, when the valve plug is turned to its normal open position, said channel 48 is displaced from the duct 47, whereby to interrupt communication between the latter and the vent valve member (see Figs. 3 and 4).

Provided in the upper portion of the train pipe communicating end 21 of the angle cock or valve casing or body 20 is a duct 50 which extends from the through passage 23 of the angle cock or valve to the periphery of the valve plug 24. This duct 50 is adapted, at proper times, to communicate with a segmental channel 51 with which the periphery of the valve plug 24 is provided. Said channel 51 is adapted to bridge the duct 50 and a passage 52 leading to the vent valve member, when the valve plug 24 is turned to a position to close the angle cock or valve through passage 23 (see Figs. 5 and 6), but, when the valve plug is turned to its normal open position, said channel 51 is displaced from the duct 50, whereby to interrupt communication between the latter and the vent valve member (see Figs. 3 and 4).

Figure 1:
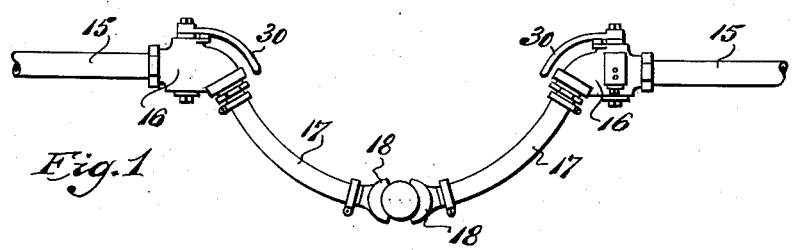
Fig. 1 is a side elevation of adjacent portions of two train pipes equipped with the angle cocks or valves of this invention, and shown as coupled together by the usual air hose members.
Figure 2:
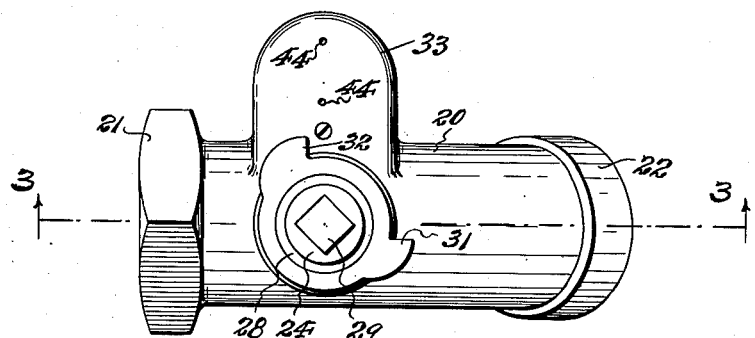
Fig. 2 is a top plan view of an angle cock or valve according to this invention.
Figure 3:
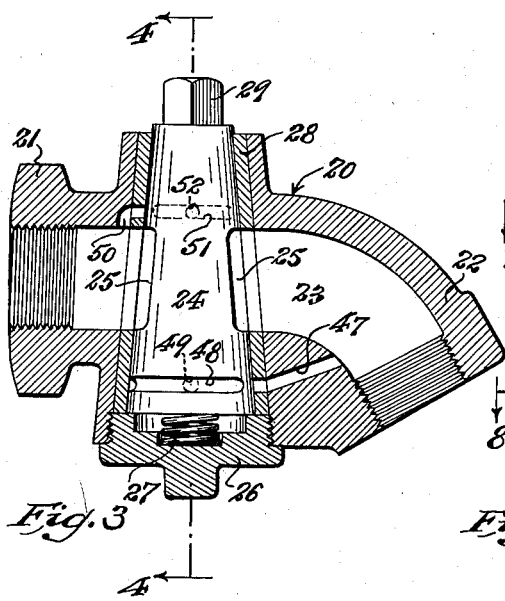
Fig. 3 is a longitudinal sectional view of the same, taken on line 3—3 in Fig. 2.

When the valve plugs 24 of angle cocks or valves in the connected train pipes of a train are turned to open positions shown in Figs. 3 and 4, air pressure in the connected train pipes and coupling hose members can be built up by pump operation under the train engineer's control, whereby to hold car brakes in their off or non-braking condition. Under these circumstances, the automatic vent valve members occupy their normal closed positions (see Fig. 4), wherein the lower piston section 38 and intermediate piston section 39 are disposed to shut off communication between the coupling hose air vent port 45 and the passage 49, and between the train pipe air vent port 46 and the passage 52.

When the valve plug 24 of an angle cock or valve in the connected train pipes of a train is turned to closed position shown in Figs. 5 and 6, its channel 48 is brought into position to communicate between the duct 47 and passage 49. As a consequence of this, compressed air in adjacent joined coupling hose members 17 can pass through the duct 47, channel 48 and passage 49 into the chamber 41 beneath the lower piston section 38 of the vent valve member. The pressure of the compressed air admitted to said chamber 41 effects uprising movement of the vent valve member which overcomes the down thrust of the compression spring S. Such uprising movement of the vent valve member is not impeded by any air pressure within the balance chamber 43 which is induced by compressed air entering said balance chamber, since this air pressure is balanced with respect to the vent valve member by reason of the fact that it exerts upward thrust against the piston section 40 which is counterbalanced by downward thrust it exerts against the intermediate piston section 39. Upward movement of the vent valve member carries its lower piston section 38 past the coupling hose member air port 45, with the consequence that communication is established between the adjacent coupling hose member and the atmosphere. When the valve plug 24 is turned to closed position, the channel 51 is also brought into position to communicate between the duct 50 and passage 52, so that compressed air in a train pipe, from which duct 50 extends, can pass through said duct 50, channel 51 and passage 52 into the chamber 43. As the vent valve member rises under air pressure set up in the chamber 41, the intermediate piston section 39 is carried past the discharge end of passage 52, with the consequence that train pipe air is admitted to chamber 42 of the vent valve member, which chamber remains in communication with the train pipe air vent port 46, and therefore train pipe air can escape to the atmosphere through said vent port 46, thus reducing air pressure in the connected train pipes of the train, so that all car brakes will set themselves in braking condition.

The air pressure in the connected train pipes and coupling hose members of the train being reduced with accompanying reduction of air pressure in the chamber 41 of the vent valve member, the compression spring S will thereupon move downward said vent valve member to its normal closed position (see Fig. 4), whereupon the connected train pipes of the train are again sealed off from the atmosphere. Under these circumstances some compressed air remains in the train pipe system, but at a pressure sufficiently reduced to allow the car brakes to remain set in braking condition. To return the set car brakes to non-braking condition, the train engineer may restore air to the train pipe system by operating an air compressing control pump, whereby to bring the train pipe contained air back to car brake releasing pressure.

From the above it will now be apparent that when any one angle cock or valve in a train series thereof is closed, either deliberately, accidentally or surreptitiously, the car brakes of the train will automatically set themselves to braking condition.

If it is desired to disconnect a rear car or cars from a train, both angle cocks or valves between cars to be separated must be closed, thereby permitting the joined intermediate coupling hose members to exhaust and the train pipes to sufficiently exhaust to apply the car brakes. The closing of said angle cocks or valves will induce operation of their respective vent valve members, in manner as hereinabove described. Thereafter the train engineer may, by using the compressed air control pump, restore brake releasing air pressure in the connected train pipes and coupling hose members of the cars ahead of the car or cars to be dropped, and thereupon move the forward cars ahead, after the intermediate hose coupling members, joined between the latter and the former, have been disjoined. It will be understood that air pressure in the train pipe or pipes of the separated car or cars will remain so reduced that the brakes of said separated car or cars will remain set in braking condition.

When both angle cocks or valves between cars to be separated are closed, it will be apparent that compressed air in the intermediate joined hose coupling members will be entirely evacuated therefrom, and consequently said adjoined hose coupling mmebers can be disjoined and separated without risk of injury to the operator.

From the above description, it will now be obvious that this invention provides an automatic compressed air vent valve member for train pipe angle cocks or valves which is of unitary character, and of very simple construction, and yet positive in action. Due to its unitary structure comprising spaced apart piston sections defining intermediate chambers adapted to be brought into and out of intercommunicating relation between a hose coupling member and a train pipe and respective vent ports operative to discharge therefrom compressed air to the atmosphere, there is little in the structure likely to get out of order in use, so that reliable performance in use is assured.

Although the novel vent means has been shown and above described in relation to a valve cock of an air brake system, it will be understood that said vent valve means per se is not necessarily limited to such use, but can be used in other associations wherein it is desired to exhaust pressure fluids from a source or sources thereof. Therefore this invention comprehends said vent valve means per se, regardless of the source or sources of pressure fluids desired to be exhausted thereby.

Having now described my invention, I claim:

Vent valve means to discharge fluid under pressure from respective sources thereof comprising a cylinder having axially spaced first and second exhaust ports in an external side wall thereof between first and second ends of said cylinder; a unitary vent valve member axially movable in said cylinder, said vent valve member comprising a stem having first, second and third piston sections axially spaced therealong intermediate its ends, said first section being nearest said first end of the cylinder, said second section being nearest the second end of the cylinder and said third section being intermediate said first and second sections, one end of said stem normally limiting movement of the vent valve member toward said second end of the cylinder, whereby to space the second piston section from said second end of the cylinder so as to provide a pressure fluid intake chamber between said second end of the cylinder and said second piston section, the second and intermediate piston sections defining a middle chamber which, in the closed position of the vent valve member, wherein said one end of the stem abuts said second end of the cylinder, closes said exhaust ports, the intermediate and first piston sections defining a balance chamber, spring means to yieldably urge the vent valve member to said closed positions, means to admit pressure fluid to said intake chamber of the cylinder and other means to admit pressure fluid to said balance chamber of the cylinder, whereby, upon increase in pressure in said intake chamber, axial movement of the vent valve member is effected which brings the intake chamber into communication with the second exhaust port and said balance chamber into communication with the first exhaust port, thereby to vent exhausting pressure fluid.

References Cited in the file of this patent

UNITED STATES PATENTS

| | | |
|---|---|---|
| 1,300,529 | Weikly | Apr. 15, 1919 |
| 2,841,170 | Kalsey | July 1, 1958 |
| 2,843,141 | Arnot | July 15, 1958 |